United States Patent
Nemzow (10) Patent No.: US 6,721,715 B2
(45) Date of Patent: *Apr. 13, 2004

(54) METHOD AND APPARATUS FOR LOCALIZING CURRENCY VALUATION INDEPENDENT OF THE ORIGINAL AND OBJECTIVE CURRENCIES

(76) Inventor: Martin A. Nemzow, P.O. Box 41-4295 1630 Daytonia Rd., Miami Beach, FL (US) 33141-0295

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,257

(22) Filed: Dec. 21, 1998

(65) Prior Publication Data

US 2001/0011241 A1 Aug. 2, 2001

Related U.S. Application Data

(60) Provisional application No. 60/079,948, filed on Mar. 30, 1998, and provisional application No. 60/079,947, filed on Mar. 30, 1998.

(51) Int. Cl.[7] .............................................. G06F 17/60
(52) U.S. Cl. ............................... 705/26; 705/1; 705/27; 705/35; 705/41
(58) Field of Search .............................. 705/35, 39, 37, 705/41, 26, 27, 1, 30; 235/70 A, 89 R (56) References Cited

U.S. PATENT DOCUMENTS 2,689,685 A * 9/1954 Giuntini .................... 235/89 R
3,083,906 A * 9/1954 Giuntini .................... 235/89 R (List continued on next page.)

FOREIGN PATENT DOCUMENTS

| JP | 402085952 A | * | 5/1988 |
| WO | WO9207330 | * | 4/1992 |
| WO | WO9811515 | * | 3/1998 |

OTHER PUBLICATIONS

Ojala "Database for foreign exchange"; Database v18n3 pp: 81–83; Dialog file: 15, Accession No. 01050719, Jun. 1995.*

Knoch The Pricing of Foreign Currency Options (Price Options, Exchange Rate); Corporate Source/Institution: Yale University(0265); Dialog file 35, Accession No. 01278926, Jan. 1992.*

(List continued on next page.)

*Primary Examiner*—Romain Jeanty
(74) *Attorney, Agent, or Firm*—Perkins Smith & Cohen LLP; Jerry Cohen; Orlando Lopez (57) ABSTRACT

The present invention is a currency translation system that provides for the dynamic translation of a first currency value into a target currency value for the purpose of aiding localization and globalization of financial transactions. The system may be used as a standalone translation system or it may be embedded in a larger application such as a financial analysis program, a spreadsheet, a compound or object-loaded document, dynamic Web pages and other dynamically-generated content, databases or stored procedures, or a Web commerce program. The system takes as input the starting currency, a target currency, and transaction rules. The system maintains a database of currency rates, currency histories, conversion rules and currency representation data. Optimization and backtracking techniques are used to deal with partial rate information and in order to find optimal valuations involving a chain of currency translations. The system can produce a single result or a matrix of results from which the user can choose an optimal valuation. The system also provides for the formatting of a numerical currency value into a presentation specific to the locale of the translation request.

19 Claims, 4 Drawing Sheets

U.S. PATENT DOCUMENTS

| | | | | |
|---|---|---|---|---|
| 3,023,956 A | * | 3/1962 | Rondthaler | 235/89 R |
| 3,795,795 A | * | 3/1974 | Gulbransen, Jr. | 235/89 R |
| 4,028,529 A | * | 6/1977 | Van DeWeghe | 235/89 R |
| 4,034,492 A | | 7/1977 | Matsuda | 40/70 R |
| 4,120,451 A | * | 10/1978 | Stapleton | 235/89 R |
| 4,251,867 A | * | 2/1981 | Uchida et al. | 705/39 |
| 4,766,293 A | * | 8/1988 | Boston | 705/41 |
| 4,926,368 A | | 5/1990 | Morita et al. | 708/206 |
| 5,189,608 A | * | 2/1993 | Lyons et al. | 364/408 |
| 5,237,500 A | | 8/1993 | Perg et al. | 364/408 |
| 5,448,043 A | | 9/1995 | Nakano et al. | 235/379 |
| 5,541,837 A | | 7/1996 | Fushimoto | 364/419.02 |
| 5,608,874 A | | 3/1997 | Ogawa et al. | 395/200.15 |
| 5,644,721 A | | 7/1997 | Chung et al. | 395/206 |
| 5,644,775 A | | 7/1997 | Thompson et al. | 395/757 |
| 5,659,765 A | | 8/1997 | Nii | 395/754 |
| 5,664,206 A | | 9/1997 | Murow et al. | 704/8 |
| 5,701,423 A | | 12/1997 | Crozier | 395/335 |
| 5,787,402 A | * | 7/1998 | Potter et al. | 705/37 |
| 5,897,621 A | * | 4/1999 | Boesch et al. | 705/26 |
| 5,969,974 A | * | 10/1999 | Vandenbelt et al. | 364/705.01 |
| 6,065,673 A | * | 5/2000 | Kokkila | 235/379 |
| 6,128,598 A | * | 10/2000 | Walker et al. | 705/14 |
| 6,199,046 B1 | * | 3/2001 | Heinzle et al. | 705/1 |
| 6,205,433 B1 | * | 3/2001 | Boesch et al. | 705/26 |
| 6,269,345 B1 | * | 7/2001 | Riboud | 705/35 |

OTHER PUBLICATIONS

Bill European Money Conversion to Impact IT Systems, Mar. 18, 1998, Newsbytes News Network.*

VMark Software, Inc "VMark Technical Bulletin", 1994, VMark Software, 6 pages.*

Global$ell Pro "Products from Network Performance", Network Performance Institute, Inc. 1997.*

Global$ell Pro "GlobalSell and GlobalSellpro Document Products", Network Performance Institute, Inc. 1997.*

Choi "Resolving the inflation/currency translation dilemma", 1994, Management International Review v34 (Special Issue) PP: 19–27, Dialog file 15, Accession No. 00952596.*

* cited by examiner

METHOD AND APPARATUS FOR LOCALIZING CURRENCY VALUATION INDEPENDENT OF THE ORIGINAL AND OBJECTIVE CURRENCIES

CROSS-REFERENCE TO RELATED APPLICATIONS

This application claims priority of U.S. provisional application No. 60/079,947 filed Mar. 30, 1998 and U.S. provisional application No. 60/079,948 filed Mar. 30, 1998.

FIELD OF THE INVENTION

This invention relates generally to computer systems and more particularly to dynamically converting a first currency to a second currency on a computer system.

BACKGROUND OF THE INVENTION

The need to convert currencies presents an ongoing problem in international commerce and includes not only the need to translate between the currencies of a sender of a product and a receiver, but also those of handlers of the product and any taxing entities in between the sender and receiver. Further, translation between currencies involves translating representations of the currencies as well as translating currency values.

While currency conversion is at face value a simple mathematical event, many obstacles prevent effective and direct implementation. These obstacles include the date and time sensitivity of currency values, and the complexity of rate data, that is, the time value of money. Currency rate data comprises historical rates, prior market close rates, delayed market rates, immediate market rates, future rates (forecasts and with interest-bearing components), options (bets as to future price for sales or acquisition of a currency), stripped bonds, and any other financial instruments. Currency rates vary depending on factors such as direction of currency translation (i.e. from USD to DEM or DEM to USD), bids, asks, transaction size-dependencies, and whether specific dates/times/currency pairs are missing or unavailable.

The constantly changing relative values of currencies further complicates the operation of currency translation. Currencies undergo sudden and rapid devaluation, and reissues. In addition, new currencies are introduced from time to time, as when countries join together as in the European Union, which plans on introducing a new currency, the Euro, in 1999.

Finally, a currency is not an exact entity. For example, a "dollar" could define a United States Dollar, a Sierra Leone Dollar, or many others. Each dollar has a different value in reference to each other, a value which fluctuates by usage, the size of the translation, and over time. The dollar may also have a different value based on where a trade (or posted bid/ask) takes place. Further, the currency of a specific country is not always a single entity, and could be represented by multiple currencies of common acceptance. The Franc and the Peso are both openly used in Andorra, for example.

A reliable currency translation system must be able to handle the following situations: missing rate information, translation from an original currency basis to an objective currency target through one or more intermediate currencies, and transaction costs and spreads where bid and ask or future contracts can substantially devalue the results.

In the case where a potential customer wants to compare costs of goods or services available from sources in a plurality of countries, such as a trans-oceanic telephone circuit at the countries terminating that line, the task quickly becomes time-consuming and onerous. There is a need for a system to perform this task efficiently and accurately.

In accounting functions including financial statements and projections, etc., it is desirable to have a uniform asset base in order to track currency data with respect to time. There is a need for a system which translates currency to base values which can be compared over time.

A new aspect of international commerce has emerged in the form of the Internet. A problem in Web-based commerce is that online catalogs display pricing information in the local currency of the business hosting the online catalog regardless of scope, customer reach, or target market of the offered products. Global commerce, however, is not specific to language or currency, and there is a need for a method for translating currencies from a base currency of a hosting business to a currency useful for potential customers using a Web site. An accurate and reliable means for translating between currencies would also be useful to potential customers reading printed publications, or otherwise involved in international trade.

Conversion of the value alone from one currency to another is insufficient for complete solution to the problems of currency conversion. Currencies are not displayed the same way in every country and customers expect that a currency format is localized with the prevailing accepted syntactical standard. It would be very useful, for example, for a Web user accessing a page originating in another country to see prices in the Web user's own currency, displayed in the locally accepted format. The display of currency formats in the expected format in a remote location is complex and not handled by existing systems and methods at the current time. Standard techniques for numerical formatting are insufficient because the currency value is not merely formatted, but also might contain prefixes, suffixes, unusual symbols, and sub- and superscripting.

The problem for multilingual and multiple currency web sites is that not every language or culture formats currencies (and numbers) in the same way. For example 1,000,000.00 in the U.S. becomes 1.000.000,00 in Germany. In addition, various currencies have locally accepted display formats. For example, some locales will display 1'000'000 and $_{00/100}$ (superscript/subscript) instead of 1.000.000,00. Furthermore, currency symbols and formatting are based on prefixes, suffixes, and the handling of negative values in different ways. The differences in currency representation create functional problems for banks unfamiliar with specific currencies and cultural idioms. A successful currency conversion requires both translation of currency value and conversion of the representative symbols as well as display in the appropriate format.

Finally, lack of a functional result is a serious problem for all data processing operations, which typically halt when encountering an error or lack of information. Rate data may not be immediately available at the time it is needed to fulfill a translation request. For business, and data processing, to continue, a way of handling missing data is needed in a reliable translation system.

It remains desirable to have a method and apparatus which provides easy currency translation in a manner structured to provide conversions within the natural workflow of business.

It is an object of the present invention to provide a method and apparatus for performing currency translation which accommodates dynamic currency data.

It is another object of the present invention to provide a method and apparatus for displaying product prices in local currencies on Internet or web-based product catalogs.

It is another object of the present invention to provide a method and apparatus for converting and displaying currency values in local currencies for conversion of text for printed price lists.

It is another object of the present invention to provide a method and apparatus to translate the value of assets in foreign denominations to a base currency or any other foreign currency, or currency equivalent such as gold, platinum, palladium, silver, or rhodium.

It is another object of the present invention to provide a method and apparatus to maintain a uniform asset base valuation for accounting functions such as financial statements.

It is another object of the present invention to provide a method and apparatus to provide arbitrage opportunities for currency speculation by using fast, accurate and reliable currency translation.

It is another object of the present invention to provide a method and apparatus to evaluate multiple sources for acquiring products and services based on localized costs, such as comparing the cost of a trans-oceanic telephone circuit at the countries terminating that line.

It is another object of the present invention to provide a method and apparatus to support local currency valuations in terms of the Euro (EUR currency unit mandated for introduction in 1999).

It is another object of the present invention to provide a method and apparatus to support accounting systems so that transactions can conform to the FASB 52 (1981) standards for providing cross-currency valuations at the time of the transaction or converted balance sheet rollups at current valuations.

It is another object of the present invention to provide a method and apparatus to perform logistical support for arranging international sales and delivery by providing reliable currency valuation and projections.

It is another object of the present invention to provide a method and apparatus to optimizing costs or profits for international investment transactions.

It is another object of the present invention to provide a method and apparatus to evaluate travelers' checks and other cash-convertibles.

It is another object of the present invention to provide a method and apparatus to display a currency value in the locally expected format.

It is another object of the present invention to provide a method and apparatus to resolve currency codes (common character-based and numeric), country names, exchange rate symbols, and currency names in converting from one currency to another.

It is another object of the present invention to provide a method and apparatus to provide display localization independent of any computer configuration including language settings, keyboard layouts, preferred date formats, and numerical formatting, particularly overcoming host computer configuration limitations to a single display format.

It is another object of the present invention to provide a method and apparatus to provide automatic recognition of currency information within a text-based document, formatting of that currency information into a localized display, and replacing of the original currency display with the newly created localized format.

SUMMARY OF THE INVENTION

The problems of translating between currencies are solved by the present invention of a method and apparatus for localizing currency valuations.

The present invention is a currency translation system that provides for the dynamic translation of a first currency value into a target currency value for the purpose of aiding localization and globalization of financial transactions. The system may be used as a standalone translation system or it may be embedded in a larger application such as a financial analysis program or a Web commerce program. The system takes as input the starting currency, a target currency, and transaction rules. The system maintains a database of currency rates, currency histories, conversion rules and currency representation data. Optimization and backtracking techniques are used to deal with partial rate information and in order to find optimal valuations involving a triangulation of currency translations. The system can produce a single result or a matrix of results from which the user can choose an optimal valuation. The system also provides for the formatting of a numerical currency value into a presentation specific to the locale of the translation request.

Further, the system includes support for translation from a single original currency to plural objective currencies, either as a single original to a single objective, a single original to plural objectives, plural originals to one-for-one plural objectives, plural originals to plural objectives. In other words, one basis can generate a specific target or a list of targets in different currencies, or multiple sources can generate a one-for-one translation or a complex collection of lists.

By providing a middleware application (inline in-process system and method) that is easily placed between other computer procedures, the currency translation system creates a new fundamental business function. This functionality extends the ease with which businesses of all types can promote products and services beyond a small, local market to a global market with a localized presence. In addition, this invention simplifies the task of evaluating assets of all types (cash-convertibles, stocks, bonds, mortgages, financial instruments, property, corporate entities, etc.) for at least two purposes. First, reduction of mixed basis values to a single currency basis simplifies asset management and accounting. Second, immediate and dynamic currency translation facilitates global finance and optimal markets in terms of locating the best investments and financing.

The currency translation system can be used to dynamically translate currencies from a base to that which is familiar to a web user in another country, to roll-up a multinational's accounting system into a single currency basis, or to evaluate an investment in different countries. The system provides for implementation of accounting systems and data storage of currency or balance sheet valuations using unlimited bases with rollup to a single or many objective currencies while accounting for the present or future value of money. The invention is a system and method that provides for the formatting of a numerical currency value into a presentation specific and necessary for the localization and globalization of business. The system formats currency values for visual display in a presentation consistent with localized expectations.

The currency translation system will facilitate local business to realize international commerce opportunities. The results for customers in the market will be acceptable and familiar rather than "foreign." This is an important aspect in creating the essence of localization and internationalization for doing business in far-off locations. The invention will expose business and software developers to a focused set of tools that facilitate global commerce without the complexities of local banking systems, brokerage quoting systems, and the general lack of currency information and services at the present time. The most immediate ramification will be the inclusion of these capabilities within online, Internet, and other electronic commerce systems, such as EDI (electronic data interchange), ACH (automated clearing house), electronic web-based storefronts, and web-based advertising. This process and method will simplify complex multiple currency and financial transaction processing operations.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
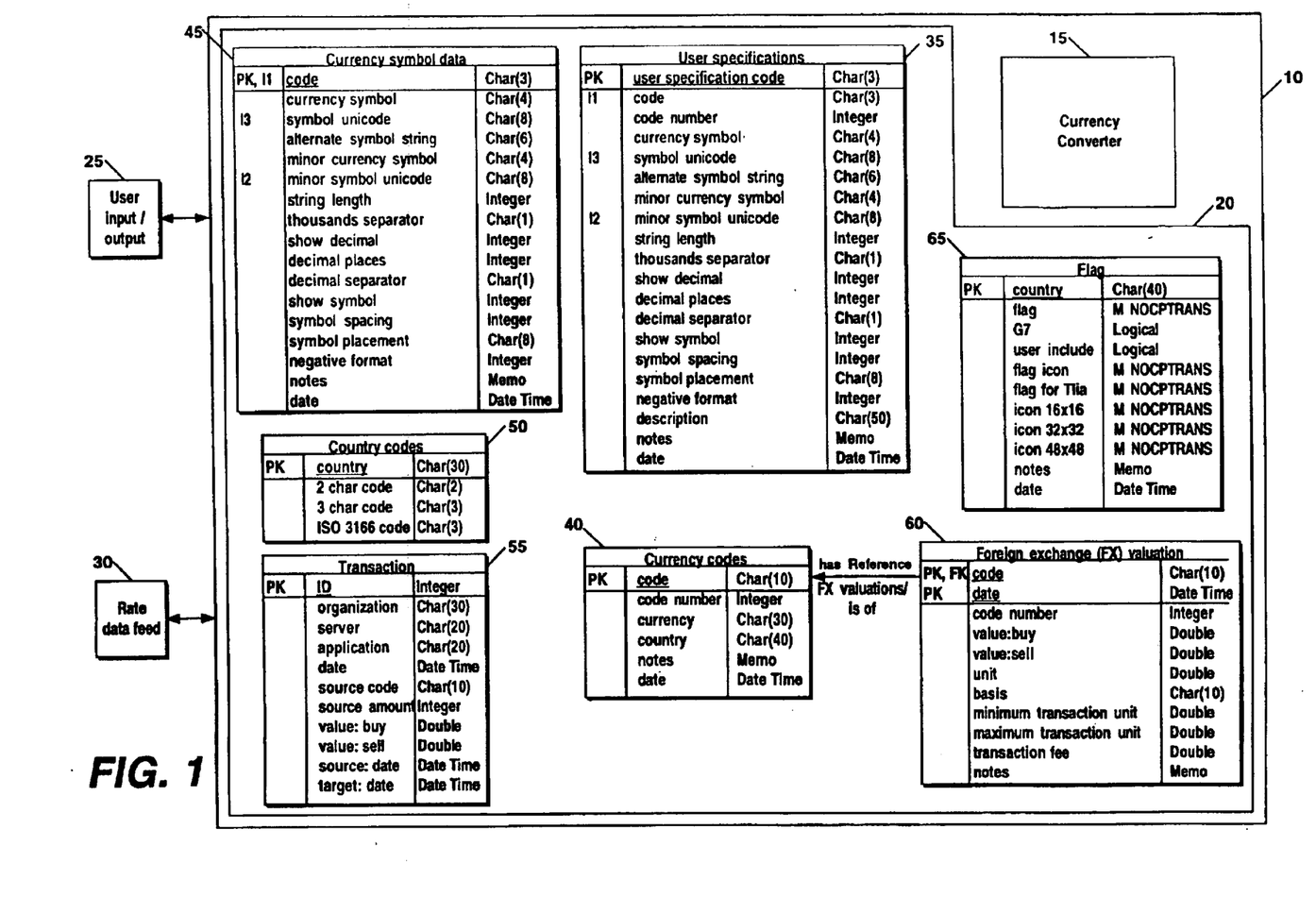
FIG. 1 is a schematic diagram of a currency converter system according to principles of the invention as implemented in a preferred embodiment thereof.

FIG. 1 shows a currency converter system 10 according to principles of the present invention. The currency converter system 10 resides generally in a computer system having a currency converter processor (hereafter referred to as the currency converter) 15, and a database 20 storing, for example, user inputs and rate information. The currency converter system 10 accepts user input 25 and provides output 25 to the user where the user may be a person at a terminal on a computer system or a computer process accessing the currency converter system 10. In a first embodiment of the currency converter system 10, a rate data feed 30 provides currently available currency rate data to the database 20.

The currency converter system 10 accepts a plurality of inputs that define a basis, or original, currency. The currency converter system 10 also accepts inputs that define the transaction. The currency converter system 10 translates the original currency value, according to these inputs and also stored conversion rules, into a value for an objective currency, or target currency. The currency converter system 10 then provides an output in a format as required by the user, whether the user is a person or a process.

In the present preferred embodiment, the user inputs are stored in the user specifications data structure 35. The substantive currency information is in a currency codes data structure 40. The information for the currency symbol and other visual presentation is in a currency symbol data structure 45. The currency country information is stored in a country code data structure 50. The transaction information, e.g. source and target dates, is in a transaction data structure 55. Information relating to the value of the transaction with respect to the transaction context is stored in a foreign exchange (FX) valuation data structure 60. A flag data structure 65 holds the data for the various flags in the currency converter system 10. These are exemplary data structures for the present preferred embodiment of the invention. The invention may be carried out using other possible data structure arrangements.

The valuation of the currency is translated according to a change in basis. That is, the objective currency value is the target value resulting from a calculation using a new basis. The basis includes the elements of: country, currency name, currency code, ISO character code, currency symbol, the relative size of the currency value, the direction of the translation, and the date and time for the currency translation. These elements are stored in the various records in the database as discussed above and the conversions are performed by the currency converter 15.

Because currency value is relative to other currencies and because value fluctuates over time due to fluctuations between currencies and the time value of money, a complex data structure is required to keep track of currency values over time in order to effectively translate currencies. This is accomplished in the present embodiment of the invention, by the combined data structures of the currency codes data structure 40 combined with the FX valuation data structure 60. The two data structures combined store currency identification information, time values and an associated basis, which is described above. For historical values of currency, currency rates would be delivered by the rate data feed, or data having multiple entries with various associated times and bases, in relation to a plurality of other currencies could be stored. In alternative embodiments, the Euro could be used as a base currency. In further alternative embodiments, a basis may be translated to a currency equivalent such as gold, platinum, palladium, silver, or rhodium.

Figure 2:
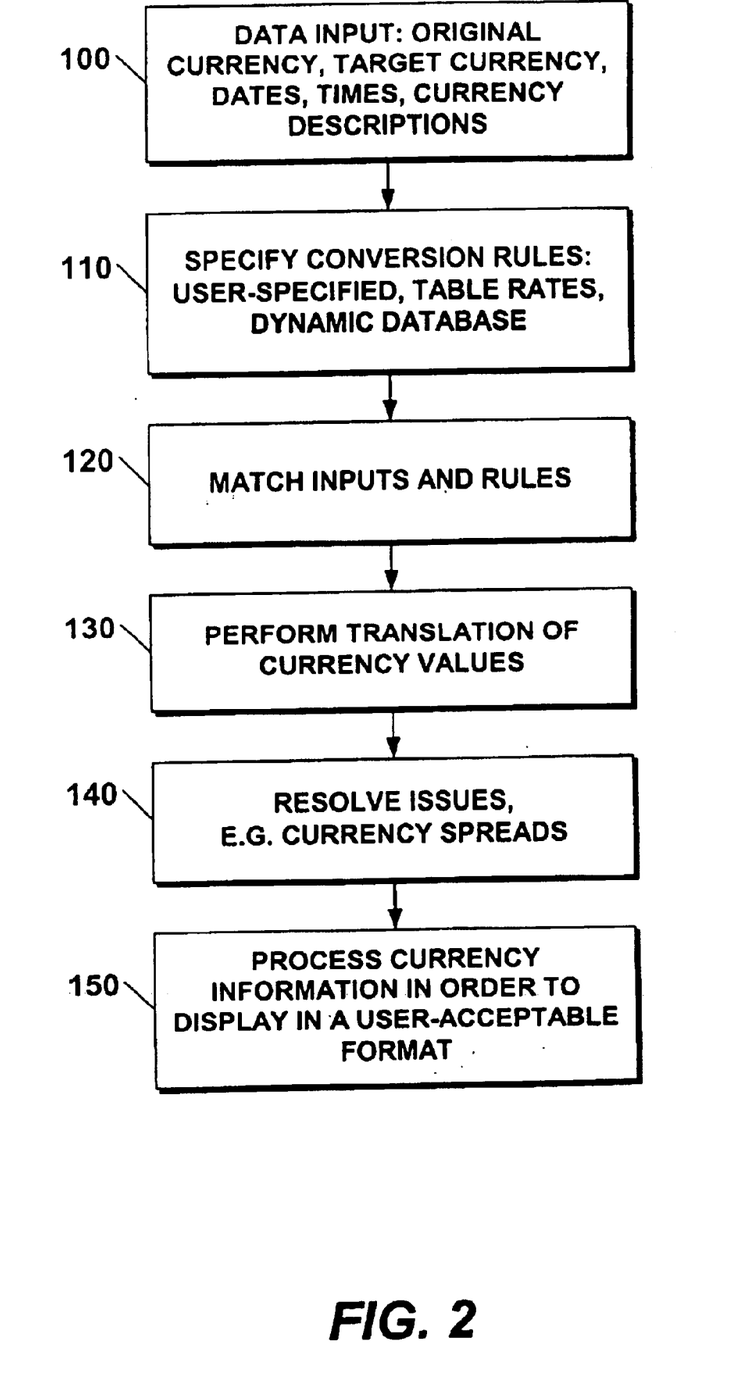
FIG. 2 is a flow chart of the operation of the currency converter system shown in FIG. 1.

FIG. 2 shows a flow chart of the method of operation of the currency converter 15. First, the currency converter 15 accepts inputs of data from the user, block 100. The user input data includes the original currency valuation, the target objective currency, and transaction rules including the dates and times defining the transaction or transactions, and descriptions of the original and objective currencies as shown in the user specifications data structure 35 in FIG. 1. The user specifications are not limited to those listed here.

The inputs could be from a human user, inputs from a computer program, or a text-based document such as a page from a Web-based catalogue. If the input is from a text-based document, a filtering process, such as any one of a number known in prior art, identifies the currency inputs in the document.

A translation process to be performed by the currency converter 15 could be a present-time conversion from one currency to another, but the process could also be a historical or future value of money through a translation of currency histories or futures, respectively, and data for those transactions may be entered accordingly. The translation process could also be from a currency basis to optioned values of currency.

Next, conversion rules are specified, block 110. Conversion rules include the conversion rate and the source of conversion rate data. The conversion rules can be taken from a number of sources: immediate user input, a database with conversion rates and country, currency, and symbol information, or computer dictionary lookup table, and/or foreign exchange rate data feeds. By taking user input for conversion rules and rates, the system can handle both known and previously unfamiliar currencies, and can calculate with both known and previously unfamiliar rates.

Next, the conversion rules are customized in response to the user inputs and the transaction rules. This step includes matching the user inputs against user specified conversion rules, a table of currency conversion rates, or a database with currency conversion rates, block 120. The database may be maintained current through various optional methods such as electronic media and delayed or live feed electronic delivery. Further, customizing the conversion rules includes operations such as reconciling currency price differences, handling complex triangulation discrepancies, computing a balance sheet, or systematic work-in-progress contra-asset category for rounding errors.

The currency value is then translated, block 130. That is, the customized conversion rules are used to translate the original currency to the target currency.

Where the currency value translation is not a straightforward application of conversion rules to input data, the translation issues are resolved, block 140. The issues may include issues of currency spreads (i.e. the difference between bid and ask prices), historical, delayed, future and/or interest laden spreads, spot quotes, swaps, future contracts, and remittances during the conversion process. In the preferred embodiment, a matrix solution is used to optimize the value of the currency using the user specification. Optimization methods of determining the most efficient path from a first point to a second point, such as determining which currency translations yield the most value, are well known and any one of a number of optimization methods may be used here. Ideally, the optimization method chosen would preserve most of the value of the base currency in the conversion process by finding the largest numerical amount resulting from currency trade preferably by checking amount breakpoints and multiple brokerages for best results.

The currency information is then processed for output based on the factors of country name, country codes, currency names, currency codes, or common currency symbols, block 150.

Figure 3:
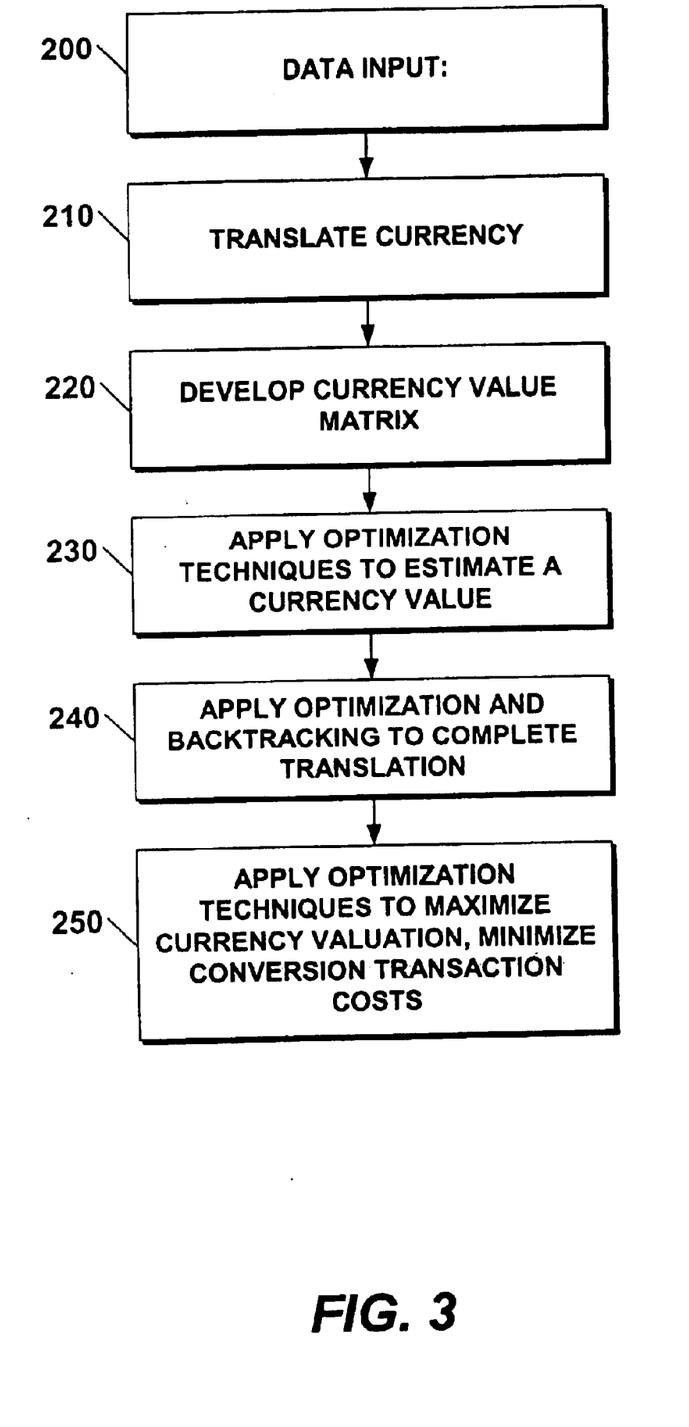
FIG. 3 is a flow chart of the operation of the currency converter employing optimization techniques in cases of partial data according to the principles of the present invention; and, FIG. 4 is a flow chart of translation of the representation of currencies according to principles of the present invention.

FIG. 3 is a flow chart which expands the process of FIG. 2 in order to provide a result even when there is missing or out-of-date data. This is important to applications such as Web-based commerce and various financial programs and any other system which requires a result.

The currency converter takes input as in the process described above in FIG. 2, block 200.

The currency is then translated to a target currency using the process disclosed in FIG. 2, block 210.

Then the original currency value(s) is replaced with an intermediate objective single or plurality of object currencies value, block 220. In other words, one or more base currencies can be translated one-for-one into a new currency or each base currency can be translated into many or all available currencies to create a matrix output.

If a currency is missing a bid, ask or close valuation between an original currency and a target currency, optimization techniques, described above in the description of FIG. 2, are applied in order to estimate a currency value, block 230. Then, backtracking techniques are applied to complete a currency translation or conversion in order to complete the process, block 240. Backtracking is a feature that reassembles new queries and compound logical constructions from existing attributes and procedures, usually to optimize or reduce complex information into a simpler form. Backtracking is often used to construct a conversion result from one currency to another directly or through one or more other intermediate currencies (also known as "triangulation"), and then process intelligently from different intermediate points to discover if there is a more efficient route. This is critical for complex data processing operations that will often stop when encountering missing or incomplete currency rates. This happens when conversion rates between two specific currencies are not current, seem in error, or are unavailable (due to rate date errors or lack of trading information) and conversion through one or more intermediate currencies facilitates the process.

Finally, optimization techniques are applied to maximize objective currency valuation and/or minimize conversion and transaction costs incurred during complex currency translations or conversions, block 250.

Using the above processes, the user, software designer, or workflow integrator can, by specifying the original currency, the objective currency, dates for the original valuation and object valuation, and the original value, apply an inferred target foreign exchange rate to scale the original valuation to the objective valuation. The original valuation can reside in a database, as a record, as a text file, or a stream inside a larger text stream. The translation is immediate and is dynamically correct based on the accuracy of the conversion rate data and the inputs.

The middleware implementation of the above-described translation engine provides for immediate, dynamic, and in-line conversion of a currency. This means it can be used for display of online web-based transactions in the local currency or used for the dynamic valuation of worldwide assets in a single currency of cash, fixed, or long-term assets within an accounting system. In addition, the functionality can be attached to a database (through object-orientivity) so that translation and display of a currency is automatic without additional labor input at time of display or usage.

Figure 4:
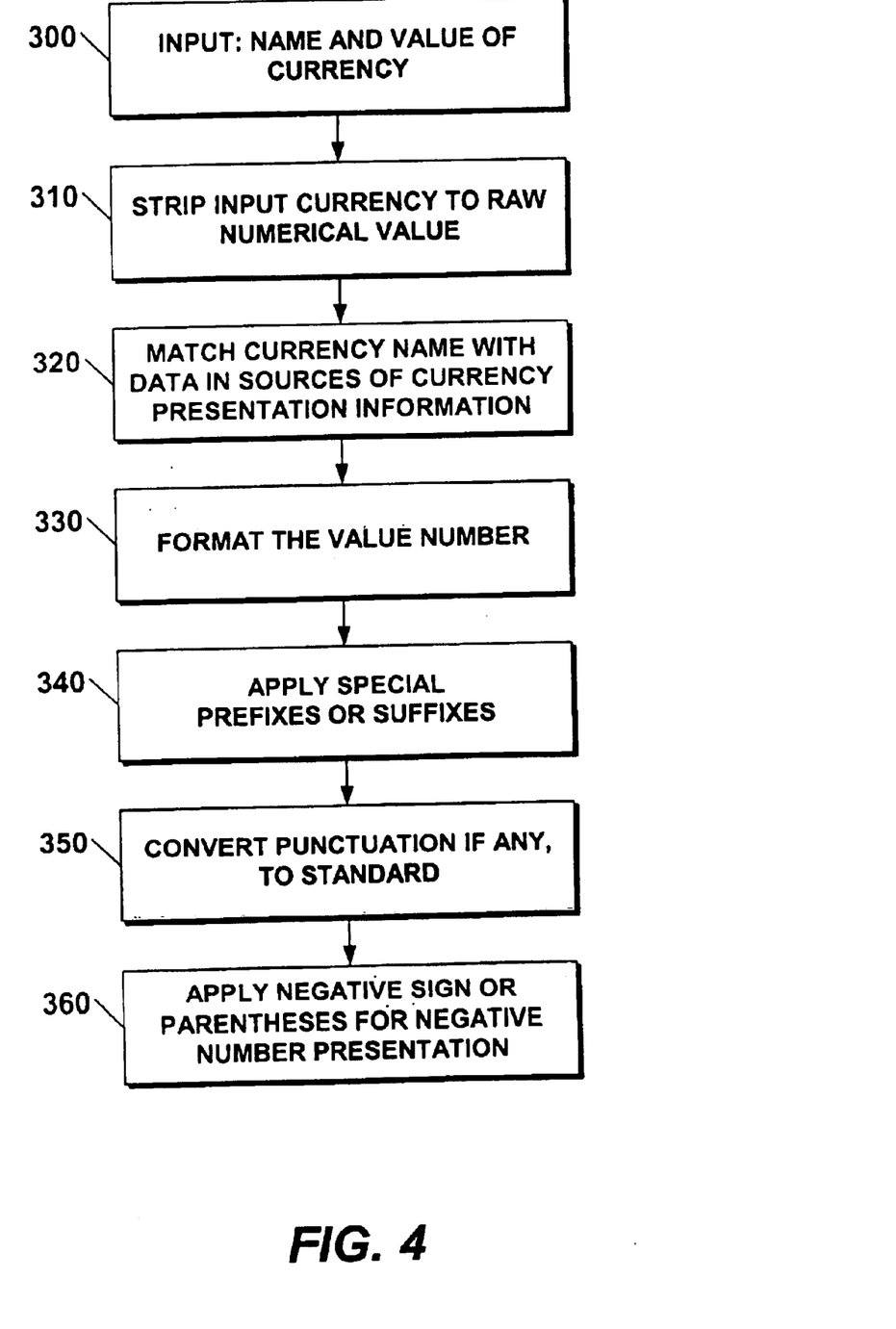

FIG. 4 is a flow chart showing the process of presenting a translated currency in a comprehensible format, i.e. in the format expected by one using the target currency. The process and method that accepts various inputs that define the numerical value of a currency and the name of that currency. This is used to match the necessary parameters against user specifications, a table of prevailing currency formats, or a database with currency presentation rules. A raw numerical number is formatted to be comprehensible and match the common business practices of the objective location. User-specifications, table lookups, or database references provide the information to handle currency presentation applying the local currency prefixes, suffixes, and the currency-specific symbols, and the process provides the sequences to create the objective currency in the appropriate localized format.

The process takes as input the name and value of the currency to be represented, block 300. Then, the input is stripped to a raw numerical value, block 310. The currency name is than matched to the sources of currency presentation information: user-specifications, table lookups, or database references, block 320. Then the number representing the value of the currency is formatted according to the currency presentation information, block 330. The appropriate prefixes or suffixes are then applied, block 340. The currency punctuation is standardized according to the presentation information, block 350. Finally, a negative sign or parentheses are applied to the result, or the result is displayed in red in color displays, if the result is a negative number, block 360. In this way, a user sees currency represented in an understandable format in the representation accepted local to the user.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A system for translating a first currency value to a second currency value, comprising:

at least one input component capable of providing a first currency value, a target currency value, and transaction rules;

at least one database capable of storing conversion rules;

at least one processor;

at least one computer usable medium having computer readable code embodied therein, the computer readable code being capable of causing the at least one processor to:

apply optimization methods to maximize a yield of a conversion, said optimization producing customized conversion rules between any two currency values for application at each successive conversion; and, apply said customized conversion rules at each said successive conversion step in a series of translation transactions until an optimized value of said target currency is obtained;

the application of optimization methods being capable of causing the at least one processor to resolve conversion issues including differences between bid and ask prices, historical spreads, delayed spreads, future spreads, interest laden spreads, spot quotes, swaps, future contracts, and remittances during the conversion process;

the optimized value being a largest numerical amount obtained from currency translation.

2. The system of claim 1 wherein the computer readable code is further capable of causing the at least one processor to:

provide intermediate objective currency values; and, apply the optimization methods to estimate information in order to resolve partial information;

the estimation of information being capable of causing the at least one processor to resolve partial information, the partial information including missing a bid valuation between an original currency and a target currency, an ask valuation between an original currency and a target currency, and a close valuation between an original currency and a target currency.

3. The system of claim 1 wherein said database is also capable of storing historical rate data.

4. The system of claim 3 wherein the computer readable code is further capable of causing the at least one processor to:

apply backtracking techniques to use historical rate data when up-to-date data is not available.

5. In a computer, a method for translating a first currency value to a second currency value along an optimized translation path, comprising the steps of:

providing a first currency value;

providing a target currency value;

providing transaction rules;

providing conversion rules to be applied to the first currency value and subsequent intermediate currency values;

applying optimization methods to maximize a yield of a conversion, said optimization producing customized conversion rules between any two currency values for application at each successive conversion; and, applying said customized conversion rules at each said successive conversion step in a series of translation transactions until an optimized value of said target currency is obtained;

the application of optimization methods enabling resolution of conversion issues including differences between bid and ask prices, historical spreads, delayed spreads, future spreads, interest laden spreads, spot quotes, swaps, future contracts, and remittances during the conversion process;

the optimized value being a largest numerical amount obtained from currency translation.

6. The method of claim 5 wherein the conversion rules include currency rate information.

7. The method of claim 5 wherein the conversion rules comprise historical currency exchange rate information, whereby a past first currency value is converted to a past target currency value.

8. The method of claim 5 wherein the conversion rules comprise projected currency exchange rate information, whereby the projected currency exchange rate information enables converting a projected first currency value to a projected target currency value.

9. The method of claim 5 wherein the conversion rules include user-specified rules.

10. The method of claim 5 wherein customizing the conversion rules further includes reconciling currency price differences.

11. The method of claim 5 wherein customizing the conversion rules further includes reconciling triangulation discrepancies and rounding differences.

12. The method of claim 5 further comprising the step of:

providing intermediate objective currency values; and, wherein the step of applying optimization methods further includes the step of:

estimating information in order to resolve partial information;

the estimation of information enabling resolution of partial information, the partial information including missing a bid valuation between an original currency and a target currency, an ask valuation between an original currency and a target currency, and a close valuation between an original currency and a target currency.

13. The method of claim 12 further comprising the step of:

applying backtracking techniques in obtaining said optimized value.

14. The method of claim 5 further comprising:

backtracking currency histories to use historical rate data when up-to-date data is not available.

15. The method of claim 5 wherein said transaction rules further comprise a currency description associated with said first currency value.

16. The method of claim 15 wherein said currency description further comprises a code, a code number and a currency symbol.

17. The method of claim 5 wherein said transaction rules further comprise a currency description associated with said target currency value.

18. The method of claim 17 wherein said currency description further comprises a code a code number and a currency symbol.

19. The method of claim 5 wherein the step of providing conversion rules further comprises providing exchange rates via a data feed.

* * * * *